US011111593B2

(12) United States Patent
Varadan et al.

(10) Patent No.: US 11,111,593 B2
(45) Date of Patent: Sep. 7, 2021

(54) LARGE SCALE MANUFACTURING OF HYBRID NANOSTRUCTURED TEXTILE SENSORS

(71) Applicant: Nanowear Inc., Brooklyn, NY (US)

(72) Inventors: Vijay K. Varadan, State College, PA (US); Pratyush Rai, State College, PA (US); Se Chang Oh, State College, PA (US)

(73) Assignee: Nanowear Inc., Brooklyn, NY (US)

( * ) Notice: Subject to any disclaimer, the term of this patent is extended or adjusted under 35 U.S.C. 154(b) by 747 days.

(21) Appl. No.: 14/995,334

(22) Filed: Jan. 14, 2016

(65) Prior Publication Data
US 2016/0222539 A1 Aug. 4, 2016

Related U.S. Application Data

(60) Provisional application No. 62/104,686, filed on Jan. 16, 2015.

(51) Int. Cl.
*C23C 18/44* (2006.01)
*C25D 5/56* (2006.01)
(Continued)

(52) U.S. Cl.
CPC ............ *C25D 5/56* (2013.01); *C23C 18/1641* (2013.01); *C23C 18/1692* (2013.01);
(Continued)

(58) Field of Classification Search
None
See application file for complete search history.

(56) References Cited

U.S. PATENT DOCUMENTS

| 4,367,752 A | 1/1983 | Jimenez et al. |
| 5,415,748 A | 5/1995 | Emiliani et al. |

(Continued)

FOREIGN PATENT DOCUMENTS

WO    WO-2005009092 A1 *    1/2005    ............... H05K 3/10

OTHER PUBLICATIONS

Rai, Pratyush, "Hybrid Nanostructured Textile Bioelectrode for Unobtrusive Health Monitoring" (Aug. 2013). Theses and Dissertations. 893 (Year: 2013).*

(Continued)

*Primary Examiner* — Joel G Horning
(74) *Attorney, Agent, or Firm* — Davidson, Davidson & Kappel, LLC

(57) ABSTRACT

A process for the large scale manufacturing of vertically standing hybrid nanometer-scale structures of different geometries, including fractal architecture made of flexible materials, on a flexible substrate including textiles is disclosed. The nanometer-scale structures increase the surface area of the substrate. The nanometer-scale structures may be coated with materials that are sensitive to various physical parameters or chemicals such as but not limited to temperature, humidity, pressure, atmospheric pressure, electromagnetic signals originating from biological or non-biological sources, volatile gases, and pH. The increased surface area achieved through the disclosed process is intended to improve the sensitivity of the sensors formed by coating of the nanometer-scale structure and substrate with a material which can be used to sense physical parameters and chemicals as listed previously. An embodiment with nanometer-scale structures on a textile substrate coated with a conductive, malleable and bio-compatible sensing material for use as a biopotential measurement electrode is provided.

19 Claims, 5 Drawing Sheets

Sensor fabrication technique: Flock application by electrostatic method and then Electroless plating

(51) Int. Cl.
    *C23C 18/28*     (2006.01)
    *C23C 18/20*     (2006.01)
    *C23C 18/16*     (2006.01)
    *B82Y 15/00*     (2011.01)
    *B82Y 30/00*     (2011.01)
    *B82Y 40/00*     (2011.01)
    *B82Y 99/00*     (2011.01)

(52) U.S. Cl.
    CPC ........ *C23C 18/2086* (2013.01); *C23C 18/285* (2013.01); *C23C 18/44* (2013.01); *B82Y 15/00* (2013.01); *B82Y 30/00* (2013.01); *B82Y 40/00* (2013.01); *B82Y 99/00* (2013.01)

(56) References Cited

U.S. PATENT DOCUMENTS

| | | |
|---|---|---|
| 5,423,956 A | 6/1995 | White et al. |
| 5,501,229 A | 3/1996 | Sekler et al. |
| 5,749,365 A | 5/1998 | Magill |
| 5,800,614 A * | 9/1998 | Foust ............... B05C 5/0275 |
| | | 118/315 |
| 5,802,607 A | 9/1998 | Triplette |
| 5,830,805 A * | 11/1998 | Shacham-Diamand ................ |
| | | C23C 18/1683 |
| | | 438/678 |
| 5,853,005 A | 12/1998 | Scanlon |
| 6,047,203 A | 4/2000 | Sackner et al. |
| 6,662,032 B1 | 12/2003 | Gavish et al. |
| 6,687,523 B1 | 2/2004 | Jayaramen et al. |
| 7,136,693 B2 | 11/2006 | Brodnick |
| 7,319,895 B2 | 1/2008 | Klefstad-Sillonville et al. |
| 7,354,877 B2 | 4/2008 | Rosenberger et al. |
| 7,390,760 B1 | 7/2008 | Chen et al. |
| 7,559,902 B2 | 7/2009 | Ting et al. |
| 7,592,276 B2 | 9/2009 | Hill et al. |
| 7,857,777 B2 | 12/2010 | Larson et al. |
| 7,862,624 B2 | 1/2011 | Tran |
| 7,871,700 B2 | 1/2011 | Poulin et al. |
| 8,348,841 B2 | 1/2013 | Varadan |
| 10,131,993 B2 | 11/2018 | Varadan |
| 10,231,623 B2 | 3/2019 | Varadan |
| 2005/0034485 A1 | 2/2005 | Klefstad-Sillonville et al. |
| 2006/0024499 A1* | 2/2006 | Kim ............... B82Y 10/00 |
| | | 428/401 |
| 2006/0175581 A1 | 8/2006 | Douglas |
| 2006/0252999 A1 | 11/2006 | Devaul et al. |
| 2006/0282021 A1 | 12/2006 | Devaul et al. |
| 2007/0049842 A1 | 3/2007 | Hill et al. |
| 2007/0120297 A1 | 5/2007 | Weider |
| 2008/0083740 A1 | 4/2008 | Kaiserman |
| 2008/0139911 A1 | 6/2008 | Chandrasekaran et al. |
| 2008/0287769 A1 | 11/2008 | Kurzweil et al. |
| 2009/0024017 A1 | 1/2009 | Ruffini |
| 2009/0088652 A1 | 4/2009 | Tremblay |
| 2009/0306485 A1 | 12/2009 | Bell |
| 2010/0068461 A1 | 3/2010 | Wallace et al. |
| 2010/0185398 A1 | 7/2010 | Berns et al. |
| 2010/0198038 A1 | 8/2010 | Nagata |
| 2010/0273049 A1 | 10/2010 | Vidal et al. |
| 2010/0274100 A1 | 10/2010 | Bahar et al. |
| 2011/0004088 A1 | 1/2011 | Grossman |
| 2011/0260115 A1 | 10/2011 | Kim |
| 2013/0211208 A1 | 8/2013 | Varadan |
| 2013/0281795 A1 | 10/2013 | Varadan |
| 2013/0281815 A1 | 10/2013 | Varadan |
| 2017/0354372 A1 | 12/2017 | Varadan |

OTHER PUBLICATIONS

Lao et al. "Hierarchical Oxide Nanostructures" J. Mater. Chem., 14, 770-773. Oct. 23, 2003.
Uberoi, et al., Interpretation of the Electrocardiogram of Young Athletes, Circulation, 124: 746-757 (2011).
American Heart Association, "Heart Rate Variability: Standards of Measurement, Physiological Interpretation, and Clinical Use" Circulation. 1996; 93: 1043-1065.
Dekker et al., "Heart Rate Variability from Short Electrocardiographic Recordings predicts Mortality from All Causes in Middle-Aged and Elderly Men" American Journal of Epidemiology, vol. 145, No. 10, 1997, 899-908, http:aje.oxfordjournals.org/accessed on Oct. 25, 2012.
Huei et al., "Develop an efficient Electrode to detect ECG signal" download from the internet prior to Aug. 19, 2011.
Hulley et al., "Randomized Trial of Estrogen Plus Progestin for Secondary Prevention of Coronary Heart Disease in Postmenopausal Women" Estrogen Plus Progestin and CHD, JAMA Aug. 19, 1998—vol. 280, No. 7 (9 pages).
Indiareport, "Now a vest that tracks medical condition" dated Oct. 12, 2011, http://www.indiareport.com/news-details/print_news.php?id=11 . . . accessed Oct. 13, 2011 (1 page).
Jahrsdoerfer et al., "Clinical Usefulness of the EASI 12-Lead Continuous Electrocardiographic Monitoring System" CritCare Nurse 2005; 25:28-37, cnn.aacnjournals.org, accessed on Oct. 25, 2012.
Kleber, "ST-segment elevation in the electrocardiogram: a sign of myocardialischemia" Cardiovascular Research 45 (2000) 111-118.
Leicht et al., "Heart rate variability and endogenous sex hormones during the menstrual cycle in young women" Experimental Physiology, Manuscript received Nov. 28, 2002, ep.physoc.org, accessed Oct. 25, 2012 (6 pages).
Leonarduzzi et al., "Wavelet Leader Based Multifractal Analysis of heart Rate Variability during Myocardial Ischemia" 32nd Annual International Conference of the IEEE EMBS Buenos Aires, Argentina, Aug. 31-Sep. 4, 2010 (4 pages).
Llyod-Jones et al., "Heart Disease and Stroke Statistics—2010 Update, a Report from the American Heart Association" Circulation, http//circ.ahajournals.org/accessed on Oct. 25, 2012.
Narayan., "T-Wave Alternans and the Susceptibility to Ventricular Arrhythmias" Journal of the American College of Cardiology, vol. 47, No. 2, 2006, 269-281.
Nussmeier "The female perspective: Gender in cardiothoracic surgery" The Journal of Thoracic and Cardiovascular Surgery, Sep. 2003, 126: 618-9.
Pan et al., "A Real-Time QRS Detection Algorithm" IEEE Transactions on Biomedical Engineering, 328.
Rudinac et al., "Fractal and Multifractal Analysis of heart Rate Variability" Telsiks, Sep. 26-28, 2007, 325-328.
Scanlon, "Acoustic Sensor Pad for Physiology Monitoring" Proceedings—19th International Conference—IEEE/EMBS Oct. 30-Nov. 2, 1997 (4 pages).
Tabibiazar et al., "Silent Ischemia in People with Diabetes: A Condition That Must be Heard" Clincal Diabetes, vol. 21, No. 1, 2003 (5pages).
Varadan et al. "e-bra with Nanosensors for Real Time Cardiac Health Monitoring and Smartphone Communication" Journal of Nanotechnology in Engineering and Medicine, May 1, 2011, vol. 2 (7 pages).
Varadan et al. "e-Nanoflex Sensor System: Smartphone-Based Roaming Health Monitor" Journal of Nanotechnology in Engineering and Medicine Feb. 1, 2010, vol. 2 (11 pages).
Varadan, "Wireless Point-of-Care Diagnosis for Sleep Disorder With Dry Nanowire Electrodes" Journal of Nanotechnology in Engineering and Medicine Aug. 2010, vol. 1 (11 pages).
Varadan, "Am EKG in your Underwear. Nanostructured sensors, smartphones, and cloud computing promise a new platform everyday medical morning." Mechanical Engineering Magazine, http://memagazine.asme.org/Articles/2011/October/EKG_Underwear.cfm? PrintPage=yes, accessed Oct. 14, 2011 (5pages).
Zhang et al. "Pulse Transit-Time based Blood pressure Estimation Using Hilbert-Huang Transform" 31st Annual International Conference of the IEEE EMBS Minneapolis, Minnesota, USA, Sep. 2-6, 2009 (4pages).
Vijay K. Varadan; Prashanth S. Kumar; Sechang Oh; Gyanesh N. Mathur; Pratyush Rai; Lauren Kegley; E-bra with nanosensors, smart electronics and smart phone communication network for heart

(56) References Cited

OTHER PUBLICATIONS rate monitoring. Proc. SPIE 7980, Nanosensors, Biosensors, and Info-Tech Sensors and Systems 2011, 79800S (Apr. 13, 2011); doi:10.1117/12.885649.

Growth of highly oriented carbon nanotubes by plasma-enhanced hot filament chemical vapor deposition Huang, Z. P. and Xu, J. W and Ren, Z.F. and Wang, J. H. and Seigal, M. P. and Provencio, P. N., Applied Physics Letters, 73, 3845-3847 (1998), DOI:http://dx.doi.org/10.1063/1. 122912.

Bordjiba, Mohamed Mohamedi1 and Le H Dao. Binderless carbon nanotube/carbon fibre composites for electrochemical micropower sources. nanotechnology, vol. 18, No. 3 Published Jan. 3, 2007.

Kong et al., "Spontaneous Polarization-Induced Nanohelixes, Nanosprings, and Nanorings of Peizoelectric Nanobelts" Nano Lett. vol. 3, 12 1625-1631 (2003).

Zhou, Zhengping and Wu, Xiang-Fa and Fong, Hao. Electrospun carbon nanofibers surface-grafted with vapor-grown carbon nanotubes as hierarchical electrodes for supercapacitors, Applied Physics Letters, 100, 023115 (2012).

Yan et al. (Helical Polyaniline Nanofibers Induced by Chiral Dopants by a Polymerization Process. Advanced Mateirals. 2007, 19, 3353-3357).

Kim et al. (Fabrication of carbon nanofiber, Cu Composite powder by electroless plating and microstructural evolution during thermal exposure, Scripta Materialia, vol. 52, Issue 10, May 2005, pp. 1045-1049).

Park et al. (Growth and high current field emission of carbon nanofiber films with electroplated Ni catalyst, Diamond and Related Materials, vol. 14, issues 11-12, Nov.-Dec. 2005, pp. 2094-2098).

McGary et al. (Magnetic nanowires for acoustic sensors, J. Appl. Phys. 99, 088310 (2006).

\* cited by examiner

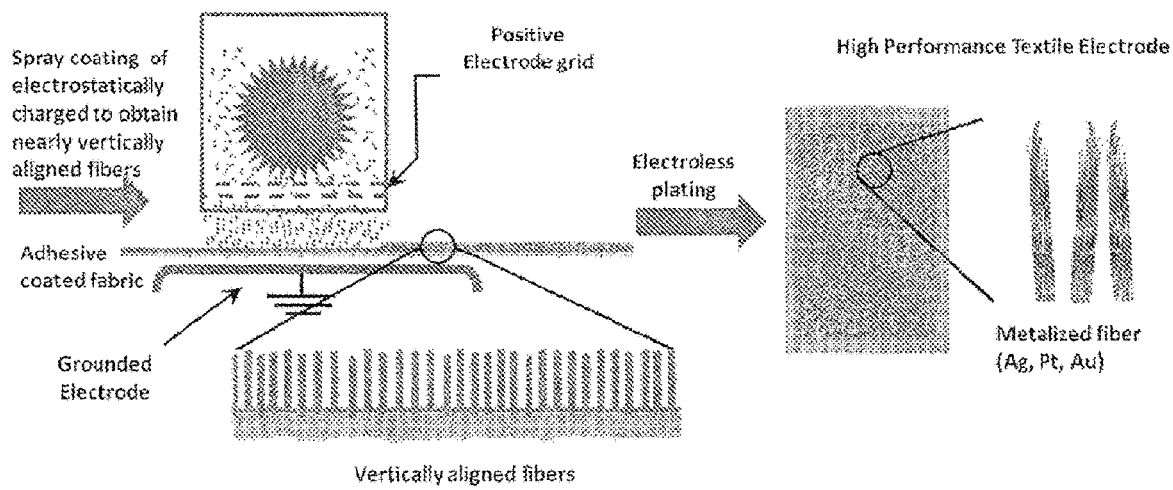
Figure 1: Sensor fabrication technique: Flock application by electrostatic method and then Electroless plating
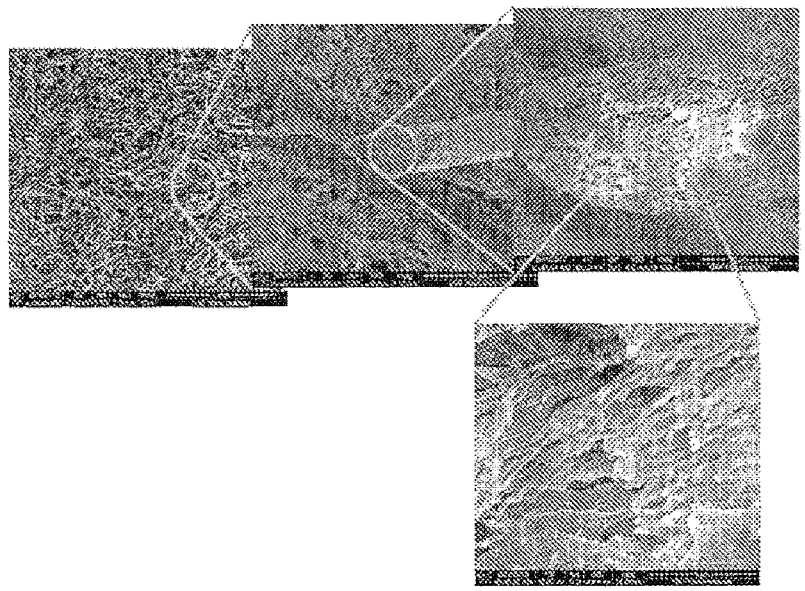
Figure 2 Nanostructured sensor surface

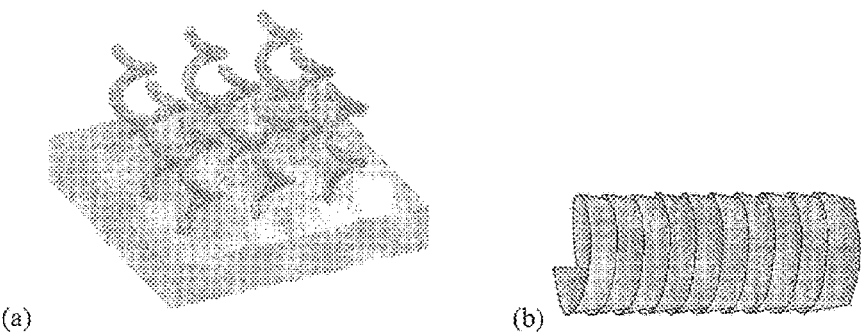
Figure 3 Helical free standing structures on sensor surface: (a) Chiral system of vertically free standing nanocoils, (b) Swiss role like structure
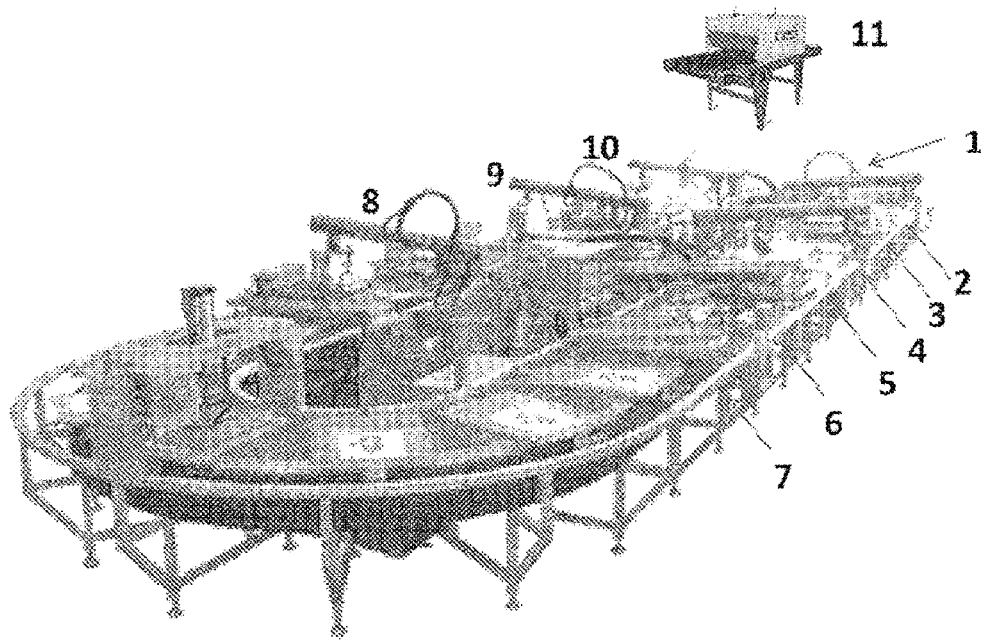
Figure 4: Large scale manufacturing of nanostructured sensors

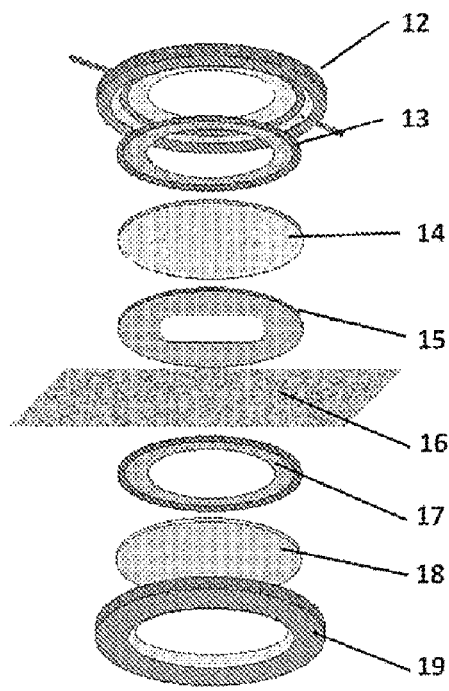
Figure 5: Flow cell set up for electroless plating
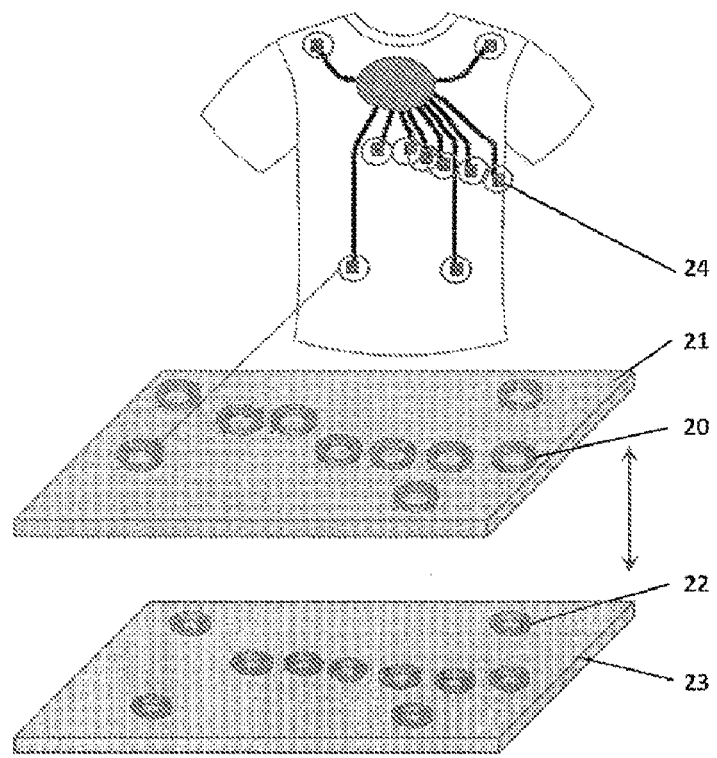
Figure 6: Press head for electroless plating scale up process

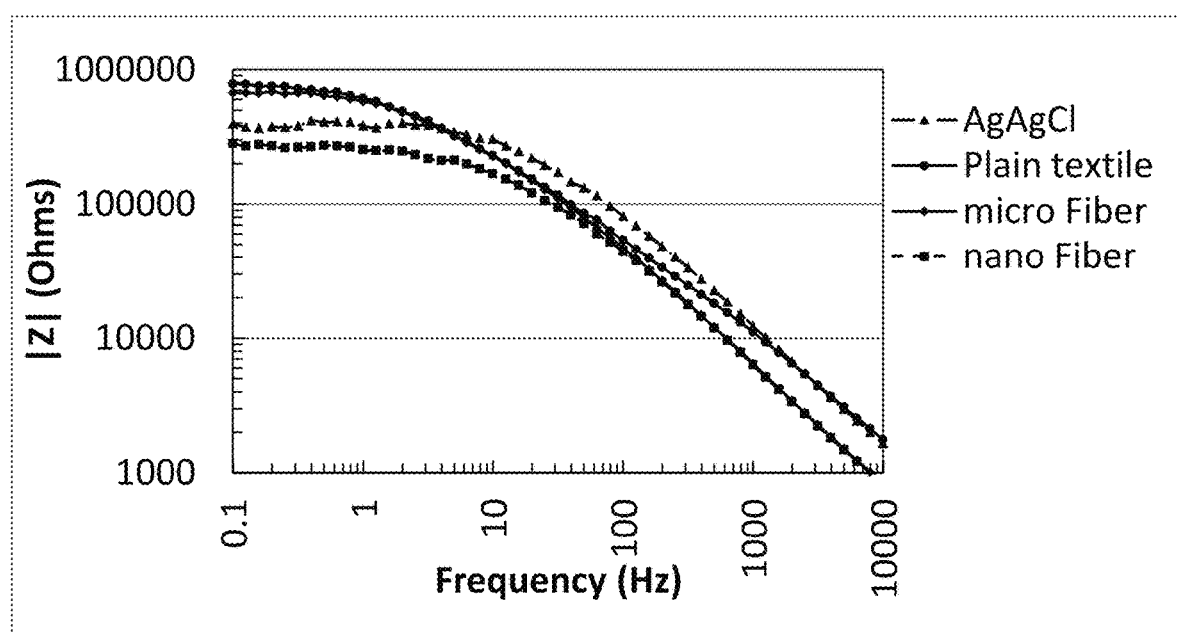
Figure 7: Comparison of impedance spectroscopy of different electrodes.

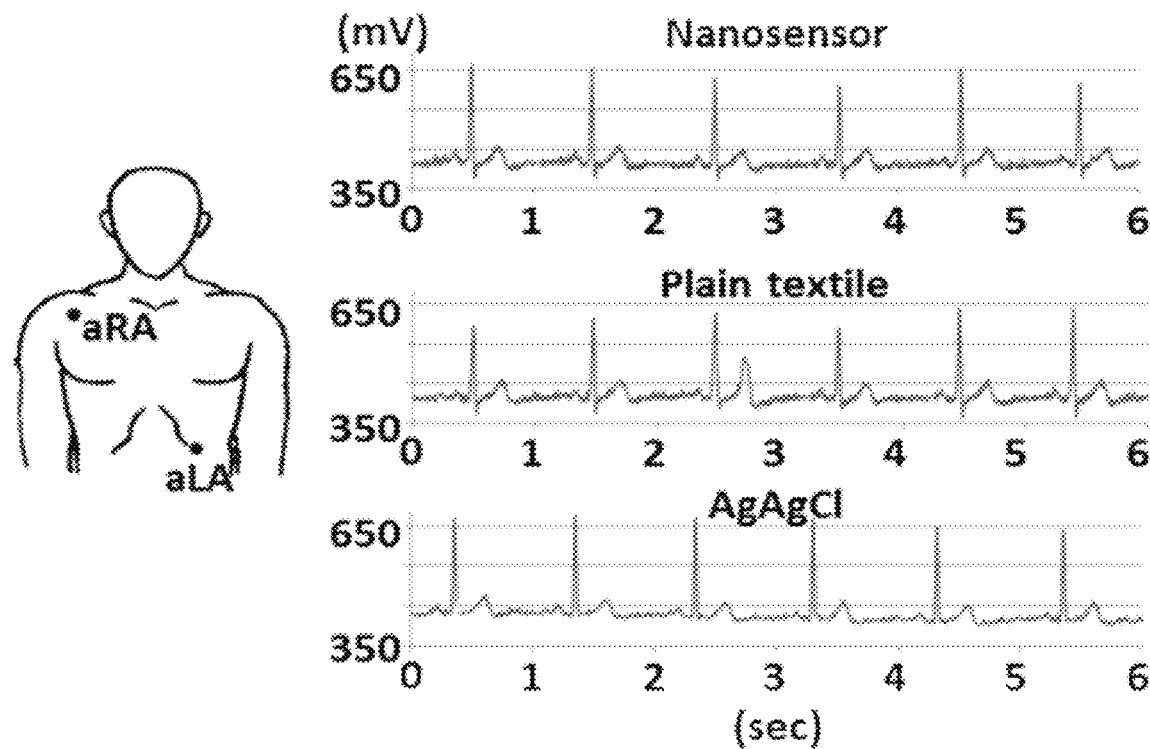
Figure 8: ECG from different electrodes
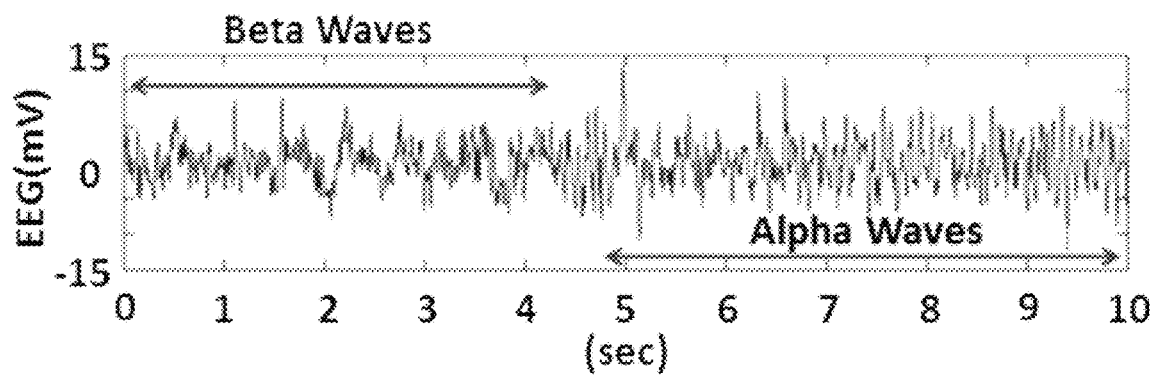
Figure 9: EEG signal from nanosensor

LARGE SCALE MANUFACTURING OF HYBRID NANOSTRUCTURED TEXTILE SENSORS

TECHNICAL FIELD

The present invention relates to a large scale manufacturing process of forming or depositing nanometer scale structures made of flexible materials such as polymers and malleable alloys or metals on flexible substrates which also may be polymers or malleable alloys or metals. The said structures increase the surface area of the said substrate. The said substrates with the said structures when coated with materials that are sensitive to various physical or chemical species or chemicals show more sensitivity due to increased surface area as compared to said substrates without said structures.

BACKGROUND

Unobtrusive health monitoring is highly beneficial for maintaining health and independence of high risk and chronic disease patients. It is an extension/expansion of healthcare service outside of the hospitals for monitoring over extended periods of time. Intelligent wearable sensor systems with simple installation, minimal maintenance, and user involvement can be the best method for ubiquitous health monitoring.

Wearable sensor systems in the form of smart clothing can contribute tremendously to self-defined and autonomous (at home) living with improved quality of life. They are cost effective and provide lightweight simple technical infrastructure. Long term real-time health monitoring is useful in chronic diseases for event detection, onset of critical episodes, and disease management through diagnostics and therapeutics. Unobtrusive health monitoring is found to be effective in prevention and early diagnosis of cardiovascular disease by non-invasively monitoring person's vital signs and physiological data.

A survey of existing ambulatory recording equipment shows that they are not capable of performing continuous remote patient monitoring. From a technological perspective, the main reasons for this are inability of conventional silver-silver chloride gel electrodes to perform long term monitoring, non-reusability, the lack of a scalable and standardized wireless communication platform for internet based health care services and lack of adequate attention to user-friendly design paradigms that would accommodate patients who are not technically trained.

Nanostructured textile-based dry sensors and electrodes are better suited for long term monitoring and measurement of electrocardiography (ECG or EKG), electroencephalography (EEG), electrooculography (EOG), electromyography (EMG), and bioimpedance with very low baseline noise, because of their improved sensitivity and ability to perform adequately with the natural moisture level of skin. [1] These textile based electrodes can be seamlessly integrated into garments of daily use such as vests and brassieres. In combination with state of the art embedded wireless network devices that can communicate with a smart phone, a laptop, or directly to a remote server through the mobile network (GSM, 4G LTE, GPRS) [2], they can function as wearable wireless health diagnostic systems that are more intuitive to use.

Electrospun nano-fibers are free range filaments that get entangled during production. In addition to that, the process is very slow (less than 1 m/sec of fiber). [3] This makes it incompatible for mass production. The fibers need to be cut in to small lengths of <100 μm for flocking. These fibers are slender and very light, They will require a high intrinsic static electrical charge and very strong applied electric field to achieve optimum flocking. Nano-fibers will also have a problem in penetrating the meniscus of the adhesive on the substrate. To solve these problems, an innovative approach has to be devised, Islands in sea fibers provide the option of textile fabrication followed by dissolving of the sea polymer to expose the nanofibers. The fibers can be cut and flocked like normal micrometer scale fibers and a subsequent dissolving step can release the nanofibers. This shall result in vertically free standing nanostructures on the textile.

Electrodes with vertically free-standing nanostructures have significantly improved sensitivity as compared to plane dry electrodes. A nanotechnology-based textile sensor with high sensitivity involves fabrication of 2D and 3D free standing nanostructures on textile fabric with functional coatings ranging from metal to piezoelectric polymer. Nanostructured sensors with different functionalities can be fabricated on the same garment. The fabrication techniques are adaptable to textile manufacturing, which makes this technology cost effective. With the help of printed conductive tracks the sensors can be connected to wireless sensor technology. In addition to that, nanotechnology-based energy harvesting systems can be implemented on the same platform to achieve low power requirements. Thus, nanotechnology-enabled, affordable, wearable wireless POC can be conceived that provides real-time health monitoring and diagnostics for patients in remote locations.

BRIEF DESCRIPTION OF THE DRAWINGS

FIG. 1 Exempary nanostructures realized on a textile by electrostatic and/or pneumatic assisted deposition of finely cut fibers.

FIG. 2 A cross-section of an exemplary bi-component fiber shows that 60-1500 islands of one-polymer fibers are distributed in a sea of another polymer. Composite fibers are deposited as microfibers, and then bundled island polymer nanofibers can be released by dissolving the sea polymer. This is followed by metallization of the structures with silver by an electroless plating method.

FIG. 3 Exemplary nanostructures in the shape of coils introduce a magnetic component in the system by virtue of the chirality of micro/nanocoils. Such structures can be used in wearable health monitoring systems as sensor elements and auxiliary to the sensor component.

FIG. 4 An exemplary assembly line with air locks (to hold screens in place and activate screen applicator) automatic (conveyor type).

FIG. 5 An exemplary flow cell set up for conductive coating on sensor region. It is integrated in the printing process for manufacturing. The cell, will have an injection and aspiration setup for coating solution and air, heating element for temperature control.

FIG. 6 Electroless plating scale up done by using a press head with a Top plate, Seal, Injection, Aspiration, and Stencil, and a Platform and a back plate with Seal, Back mesh Separate. The Press head-Platform set modified for each shirt size.

FIG. 7 Comparison of impedance spectroscopy on plain textile electrode, microstructured electrode, and nanostructured electrode with Ag/AgCl gel electrode as standard. Testing was performed on a forearm of young adult.

FIG. 8 Biopotential Signal ECG Lead II ECG signal from textile electrodes compared with Lead II signal obtained from Ag/AgCl gel electrodes.

FIG. 9 EEG signal showing Beta waves and onset of Alpha waves from nanosensor at occipital lobe position against a reference nanosensor on the mastoid bone.

DETAILED DESCRIPTION OF THE EMBODIMENTS

Free standing aligned nanostructures can be obtained on a textile electrode surface by using electrostatic and/or pneumatic assisted deposition. Such deposition uses an electric field or pneumatic force to drive down millions of individual fibers that have a static charge on them in an environment of air, water, or plasma. The electric field, in particular, aligns the charge fibers vertically, and static charge ensures that they are apart from each other. The vertically aligned fibers or fibers aligned at a glancing angle are driven down on to a flexible surface, such as a textile or polymer substrate, pretreated with adhesive for the fibers to get planted. A schematic of this process is shown in FIG. 1.

Synthetic long chain polymers such as polyester, nylon, polypropylene, polybutylene, polylactic acid, poly-acrylonitrile, polycarbonate, polyurethane, polyolefin, polyimide, and polyaramid are melt blown or solution blown, or extruded and spun into fibers on a spinneret. The techniques for drawing out the fibers can be modified to obtain fibers with a diameter in the order of nanometers (40-2000 nm). These processes can obtain fibers that are only as wide as the single layer crystal made of polymer chains. The conventional synthetic polymer fiber spinning technology can be improved to produce a composite fiber.

A mixture of two polymers, that are mutually immiscible, can be drawn in to fibers by extrusion. Such that, one polymer forms long fibers in a matrix of the other. A cross-section of such a fiber shows that 60-1500 islands of one polymer fibers are distributed in a sea of the other polymer, thus giving the impression of islands in sea. Composite fibers are best suited because they can be flocked as microfibers, and then bundled island polymer nanofibers can be released by dissolving the sea polymer (FIG. 2). A 3-dimensional helical structure (FIG. 3) can be achieved by extrusion of a composite fiber, where the constituent fibers shrink at different rates upon polymerization. The shrink rate is governed by variation in crystalline/amorphous structures of the polymers and chirality of the polymers. In one exemplary embodiment, the fibers were cut into a small length of 500 μm to 1.5 mm using a cryo-blade cooled down to −20° C. to −40° C. in order to get a clean cut with no sticky ends.

The free standing nanostructured fibers can be coated with a film of conductive material such as silver, gold, platinum, polyaniline, polypyrrole, poly(3,4-ethylenedioxythiophene) to make them electroactive for applications such as but not limited to health monitoring EKG, EEG, EOG, EMG electrode application, touch sensors, and the like. They can be coated with metal oxide such as films for capacitive sensing application such as but not limited to respiration rate, air quality, gas sensing, and water quality. They can be coated with piezoelectric material film like polypyrrol for application such as but not limited to motion sensing, acoustic transduction, noise dampening, and impact sensing.

For an exemplary EKG monitoring electrode, metallization of the structures is done with silver by electroless plating method. The surfaces of such sensor electrodes have nanoscale and mesoscale free standing conductive structures. This contributes to increasing the effective surface area of the electrodes, and a high aspect ratio of nano/mesoscale structures can overcome the obstruction due to rough skin surface and body hair. A good skin-electrode interface with these nanostructured sensor electrodes is instrumental in detection of electrophysiological signals emanating from the brain and heart to the skin surface.

Electroless plating electrically functionalizes the nanostructures by enmeshing/decorating them with a conformal conductive thin film of silver. The electroless plating process uses self-nucleation of the silver nanoparticles directly on the surface of the nanofibers.

In one exemplary embodiment, the fibers were chemically treated to impart electrostatic charge, a.k.a. activation. The fibers were prepared for the activation process by washing with hot water followed by washing with cold water. The fibers were dried before further treatment. 2-3 wt % dried fibers were added to a bath of distilled water with constant stirring at 150-200 rpm. The bath was heated with the stirring. When temperature of the bath reached 40° C., aluminum sulfate was added (1.5-1.6M) and pH of the solution was lowered to 4.5 with acetic acid. When the bath temperature reached 50° C., tannic acid was added (8.8 mM-9.4 mM). At 60° C., aluminum sulfate was further added (31 mM-34 mM). This solution was maintained at 60° C. for 30 minutes with stirring. The solution was drained out and the fibers were retained by filtration and washed with DI water 2-3 times. 2-3 wt % fibers were re-suspended in DI water. The temperature was raised under constant stirring. At 40° C., ammonium sulfate was again added (0.5M-0.55M) and the pH was brought to 5.5 with acetic acid. When the bath temperature reached 50° C., 0.3-0.6 wt % cationic softener was added. The bath temperature was brought up to 60° C. and maintained for 30 minutes with constant stirring. The solution was drained out and the fibers were retained by filtration. The fibers were dried at room temperature until only 6-8% of moisture was left. This was done for electrostatic activation of the fibers. The fibers were sifted to remove long fibers. Thus prepared fibers can be applied to a fabric such that they are free standing because of mutual repulsion.

In one embodiment, the electrostatic and/or pneumatic assisted deposition process used high strength electrostatic field of 2 kV/cm-10 kV/cm for deposition of electrostatically charged fibers. The fibers move at a high velocity under the influence of electric field applied perpendicular to the substrate (adhesive coated fabric) and were attached vertically on it. This resulted in vertically aligned microstructured or nanostructure arrays.

In one embodiment, the fabric was electrically functionalized with the help of electroless plating by enmeshing/decorating the nanostructures with a conformal conductive thin film of silver. The electroless plating process used self-nucleation of the silver nanoparticles directly on the surface of the fibers. The process had four steps: 1) pretreatment by soaking in mild detergent solution followed by deionized water rinse, 2) a 20 minutes long sensitization of fiber surface by adsorption of stannous ($Sn^{2+}$) colloids (15 mM to 18 mM $SnCl_2.2H_2O$ and 0.32%-0.4% v/v HCL) in DI water, 3) plating by using a mix of silver salt (silver acetate 0.4 g/mL in aqueous ammonium hydroxide and titration of formic acid at 0.08 mL per mL of aqueous ammonium hydroxide) and reducing agent by soaking the flocked fabric in the mix for 1 hour followed by drying the fabric in nitrogen environment and annealing at temperature in excess of 100° C., and 4) post treatment by rinsing with deionized water to remove any unreacted precursors.

The sensor fabrication process implementation on an assembly line with air locks (to hold screens in place and activate screen applicator) automatic (conveyor type) is shown in FIG. 4. The assembly line has one station each designated to (i) mounting a shirt on platen 1, (ii) base layer application for printed electronics 2, (iii) dryer for base layer 3, (iv) conductive layer application for printed electronics 4, (v) dryer for conductive layer 5, (vi) encapsulation layer for printed electronics 6, (vii) dryer for encapsulation layer 7, (viii) adhesive for electrostatic and/or pneumatic assisted deposition 8, (ix) electrostatic and/or pneumatic assisted deposition 9, (x) vacuum suction head for un-attached fibers 10, and (xi) textile finishing 11. The applicators are programmable (squeegee pressure, squeegee speed, resident time, screen spacing) automated screen printing processes, dryers are programmable (temperature control, resident time) flash curing process, the electrostatic and/or pneumatic assisted deposition process is programmable (applied voltage, resident time) automatic potentiostat assembly with occlusion screen and fiber reservoir.

Functionalization of the nanostructured fabric is conducted by conducting the process described above using the flow cell shown in FIG. 5. The cell has injection and aspiration setup in the top plate 12 for coating solution and air. The top plate and bottom plate 19 have heating elements for temperature control for the process. The seal assemblies 13, 17 ensure a leak-proof clamp around the fabric 16. The aspiration stencil 14 includes flow channels for injection and aspiration into the chamber formed with sensor stencil 15 and back mesh 18. The sensor stencil is the shape (for example, oval, circular, clover leaf, etc.) of a nanostructured region of the fabric that needs to be functionalized for electrical conductivity. The flow cell is mounted as a top part 20 on a press head 21 with the Top plate, Seal, Injection Aspiration, and Stencil, and a bottom part 22 on platform 23 with Back plate, Seal, and Back mesh. FIG. 6 shows flow cells arranged at the locations of functionalization 24 for multi-sensor assembly for an exemplary textile EKG monitoring system.

EXAMPLE

The nanostructures were realized on textile by deposition of finely cut hybrid nanostructured fibers by electrostatic assisted deposition technique (FIG. 1). These fibers comprised of 200 nanometers diameter polypropylene islands in a 30 µm polylactic acid sea of nanocomposite yarn. The process used for activation and deposition were as described above. The polylactic acid sea was dissolved using heated (40° C. to 50° C.) alkaline etching bath. The structures were electroless plated with silver as described above to become textile-based nanosensors for biopotential measurement.

Large sensor surface area results in low skin-electrode contact resistance, Thus, it helps in increasing the sensitivity of sensor electrodes. This has been shown through impedance analysis of nanostructured textile electrode in comparison with plain textile electrode and silver-silver chloride electrode (FIG. 7).

A nanosensor pair can measure differential biopotential across a source organ. In the case of ECG, the signal source is the heart. So a differential potential measurement between the augmented Right Arm (aRA) and augment Left Leg (aLL) results in a Lead II ECG signal as shown in FIG. 8. The signals from a nanosensor, a plain textile electrode, and an Ag—AgCl electrode have been plotted in the figure. Similarly, an EEG signal can be obtained by placing the nanosensors on one of the defined EEG measurement positions, e.g. occipital lobe position O1/O2, and the reference location at the mastoid bone (FIG. 9).

REFERENCES

[1] Oh, T. I., Yoon, S., Kim, T. E., Wi, H., Kim, K. J., Woo, E. J., Sadleir, R. J., "Nanofiber Web Textile Dry Electrodes for Long-Term Biopotential Recording," I FEE Trans. Biomedical, Circuits and Systems, Vol. 7(2), pp. 204-211. (2013)

Varadan, V. K., "Wearable remote electrophysiological monitoring system," Application No. US 20130281815 A1, Pub. Oct. 24, 2013. (2013)

Reneker, D. H., Chun, I., "Nanometer diameter fibers of polymer, produced by electrospining," Nanotechnology, Vol. 7, pp. 216-223. (1996)

What is claimed is:

1. A method of assembly line manufacturing comprising:
   preparing a surface of a portion of a flexible or rigid fabric or substrate to achieve adhesion for a plurality of hybrid nanostructured articles;
   depositing the plurality of said hybrid nanostructured articles;
   providing electro/electromagnetic field to achieve random or fractal pattern of said plurality of hybrid nanostructured articles upon contacting the surface; and
   selective removal of a part or whole of some of the deposited hybrid nanostructured articles
   functionalization of the deposited hybrid nanostructured articles by electroless plating using at least one flow cell comprising a seal assembly, wherein the flow cell has a top plate and a bottom plate, and wherein the portion of the fabric or substrate is disposed between the top plate and the bottom plate and within the seal assembly so that the seal assembly provides a leak-proof clamp around the portion of the fabric, the top plate having an opening for receiving coating solution and air for said electroless plating.

2. A method of claim 1, wherein the at least one flow cell includes a plurality of flow cells.

3. The method of claim 1, wherein plurality of hybrid nanostructured articles are comprised of short length multi-component yarn made with a combination of functionalized long chain polymers, and wherein the long chain polymers are functionalized by said electroless plating.

4. The method of claim 3, wherein the functionalized long chain polymers are polymers selected from the group consisting of polyester, nylon, polypropylene, polybutylene, polylactic acid, poly-acrylonitrile, polycarbonate, polyurethane, polyolefin, polyimide and polyaramid.

5. The method of claim 3, wherein said step of providing electro/electromagnetic field further comprises applying an electrostatic field of 2 kV/cm-10 kV/cm.

6. The method of claim 3, wherein said step of preparing the surface comprises applying an adhesive to the surface.

7. The method of claim 3, wherein said step of selective removal includes selective removal using a suction head.

8. The method of claim 1, wherein the fabric or substrate is flexible.

9. The method of claim 8, wherein the flow cell has heating elements located in the top plate and the bottom plate of the flow cell.

10. The method of claim 8, wherein the flow cell further comprises an aspiration stencil between the top plate and the flexible fabric or substrate, the aspiration stencil having flow channels for receiving coating solution and air.

11. The method of claim 10, wherein the flow cell further comprises a sensor stencil and a back mesh, the flexible fabric or substrate located between the sensor stencil and the back mesh, the sensor stencil and back mesh forming a chamber, the chamber receiving coating solution and air via the aspiration stencil.

12. The method of claim 11, wherein sensor stencil is the shape of a nanostructured region of the fabric to be functionalized for electrical conductivity.

13. The method of claim 10, having more than one flow cell, wherein the flow cells are arranged to provide a multisensor array.

14. The method of claim 1, wherein the seal assembly is comprised of a first seal assembly located between the top plate and the aspiration stencil and a second seal assembly located between the back mesh and the substrate.

15. The method of claim 10, wherein the top plate and the bottom plate have heating elements for temperature control.

16. The method of claim 1, wherein the flow cell has a heating element.

17. The method of claim 1, having more than one flow cell wherein the flow cells are arranged at locations of functionalization for a multi-sensor assembly for a textile EKG monitoring system.

18. The method of claim 1 wherein the step of preparing the surface includes providing a textile or polymer substrate with a surface pretreated with adhesive.

19. The method of claim 1, wherein the electroless plating applies a conformal conductive thin film of silver onto the deposited hybrid nanostructured articles.

* * * * *